United States Patent [19]
Chou

[11] Patent Number: 5,876,766
[45] Date of Patent: Mar. 2, 1999

[54] MOLDING MACHINE HAVING A LOADER ASSEMBLY FOR A FRAME

[75] Inventor: Shin-Hai Chou, Taipei Hsien, Taiwan

[73] Assignee: Powerchip Semiconductor Corp., Hsin-Chu, Taiwan

[21] Appl. No.: 898,923

[22] Filed: Jul. 23, 1997

[51] Int. Cl.⁶ ................................................. B29C 31/08
[52] U.S. Cl. ...................................... 425/126.1; 425/136
[58] Field of Search ..................... 425/116, 121, 425/126.1, 145, 135, 544, 556, 436 R, DIG. 228, 171, 136; 264/272.17, 406, 40.1

[56] References Cited

U.S. PATENT DOCUMENTS

| | | | |
|---|---|---|---|
| 4,741,787 | 5/1988 | Shimizu et al. | 264/272.17 |
| 4,812,114 | 3/1989 | Kennon et al. | 426/116 |
| 5,123,823 | 6/1992 | Banjo et al. | 264/272.17 |
| 5,200,202 | 4/1993 | Ahn | 425/116 |
| 5,286,426 | 2/1994 | Rano et al. | 264/40.1 |
| 5,297,897 | 3/1994 | Venrooij et al. | 425/116 |
| 5,391,346 | 2/1995 | Nakamura et al. | 264/272.17 |
| 5,582,845 | 12/1996 | Schad et al. | 425/126.1 |
| 5,654,017 | 8/1997 | Harmsen | 264/272.17 |

*Primary Examiner*—Robert Davis
*Attorney, Agent, or Firm*—Ladas & Perry

[57] ABSTRACT

A molding machine including: a loader assembly for receiving a frame; a press assembly for receiving the frame from the loader assembly and molding the frame; an unloader assembly for receiving the frame from the press assembly and outputting the frame after molding. Besides the molding machine further comprises: frame-supply means for transferring the frame to the loader assembly; tablet-supply means for transferring a tablet to the loader assembly; a distribution shuttle for receiving and sending the frame and the tablet to the press assembly; a first sensor positioned near the distribution shuttle for detecting the frame in a first direction; a second sensor positioned near the distribution shuttle for detecting the frame in a second direction; and a logic circuit for determining positioning of the frame and generating a signal when the frame is mispositioned.

17 Claims, 4 Drawing Sheets

MOLDING MACHINE HAVING A LOADER ASSEMBLY FOR A FRAME

FIELD OF THE INVENTION

The present invention relates in general to a molding machine, and particularly, to a molding machine for transferring a frame and resin to a mold section and precisely positioning the frame. The molding machine can further output a warning signal to interrupt the subsequent processes and reduce spill-over when the frame is mispositioned.

BACKGROUND OF THE INVENTION

The operational components of a typical injection molding machine are designed to transform stock material into a batch of molded products. A batch is a predetermined number of essentially identical molded products which are manufactured during single or multiple production runs. The operational components of an injection molding machine usually include a stock supply assembly, an extruder assembly, an injection assembly, a press assembly, and a mold pallet assembly.

In many industrial settings, it is desirable for a single injection molding machine to produce several different batches of molded products. During a typical multi-batch manufacturing shift, a first batch of molded product is created during a first production run. To begin this first production run, a first mold pallet assembly, which contains a "mold profile" reflecting the desired shape of the first batch of molded products, is installed into the machine and properly coordinated with the other assemblies of the machine.

At the completion of the production run, a second batch of molded products may be created. In a multi-batch manufacturing shift, this second batch may be different from the first batch of molded products. Consequently, in a batch-conversion it is necessary to remove the first mold pallet assembly and replace it with a second mold pallet assembly.

SUMMARY OF THE INVENTION

The present invention provides a molding machine for transferring a frame and resin contained in a tablet to a molding assembly and precisely positioning the frame. The molding machine includes a loader assembly, a press assembly, and an unloader assembly. The loader section comprises: frame-supply means for sequentially supplying a frame to the press assembly; tablet-supply means for sequentially supplying a tablet to the press assembly; and a distribution shuttle for positioning the frame from the frame-supply means and the tablet from the tablet-supply means and sending them to the press assembly. Resin and other stock material for a forming press in the press assembly is contained in the tablet. In addition, a first sensor and a second sensor are respectively secured to the loader assembly below the distribution shuttle for detecting the frame position in a first direction and in a second direction. And a logic circuit is provided in the molding machine to output an indicative signal to interrupt the molding machine and reduce spill-over when the frame is mispositioned.

BRIEF DESCRIPTION OF THE DRAWINGS

The following detailed description, given by way of example and not intended to limit the invention solely to the embodiments described herein, will best be understood in conjunction with the accompanying drawings, in which.

DESCRIPTION OF THE PREFERRED EMBODIMENT

Figure 2:
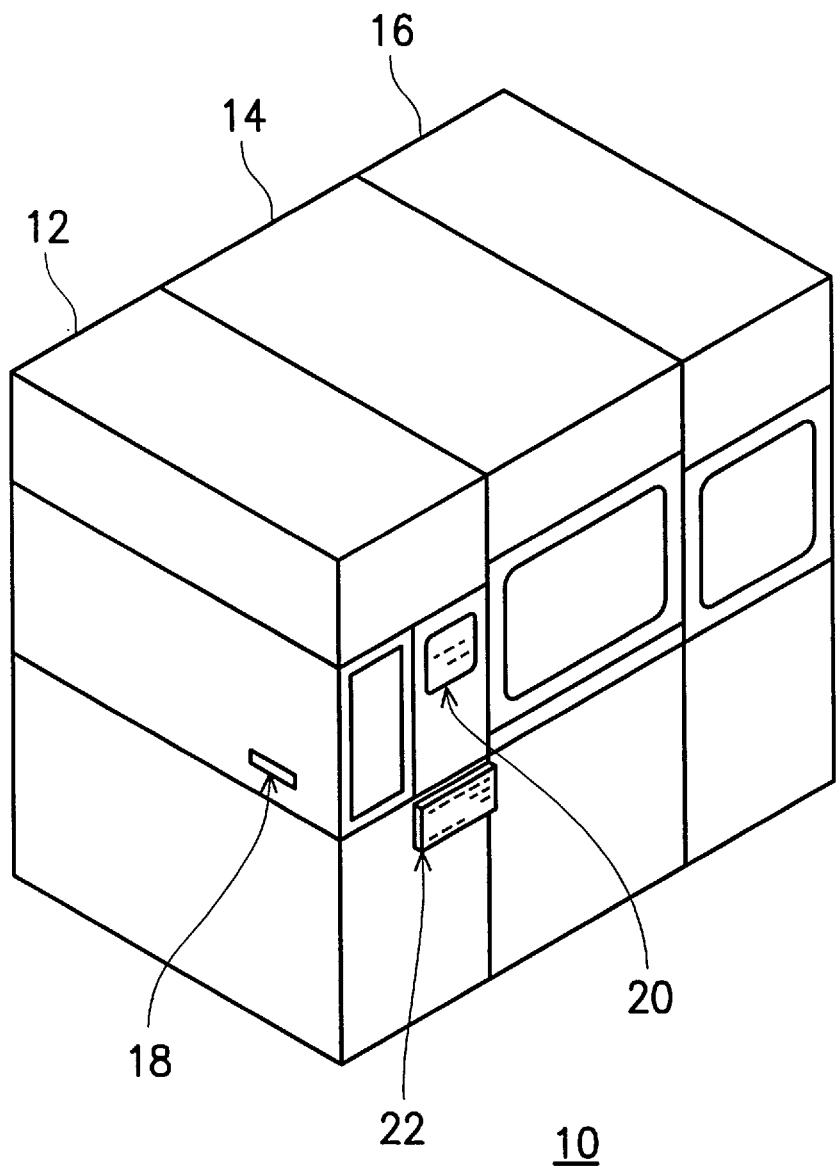
FIG. 2 is a perspective view of a molding machine according to the present invention.

Reference is made now to the drawings in detail and initially to FIG. 2, which is a perspective view of a molding machine according to the present invention. In this embodiment, the molding machine 10 comprises a loader assembly 12, a press assembly 14, and an unloader assembly 16.

As shown in FIG. 2, the loader assembly 12 of the molding machine 10 is primarily used for setting one frame-set of bonded lead frame and resin contained in a palette onto a frame transfer section of the loader assembly 12, and for sending the frame and resin simultaneously to a mold section of the press assembly 14. The press assembly 14 then receives the frame and resin sent from the frame transfer section, and seals the frame with resin by a forming press. Thereafter, the unloader assembly 16 then receives the frame sealed with resin, goes through a gate-break process, and transports the molded frame in a magazine section of the unloader assembly 16 for storage.

In addition, the loader assembly 12 in the molding machine 10 described above can further comprise a path line 18 which serves as an entry for the frame and resin, a monitor screen 20 for observing the operations of the frame, and a keyboard 22 provided for users to input manual instructions. In addition, the mold section in the press assembly 14 can also include a clamp, a plunger, an ejector, a cleaner, a mold thermal control and the like(not shown), for sealing the frames with resin by a forming press.

Figure 3:
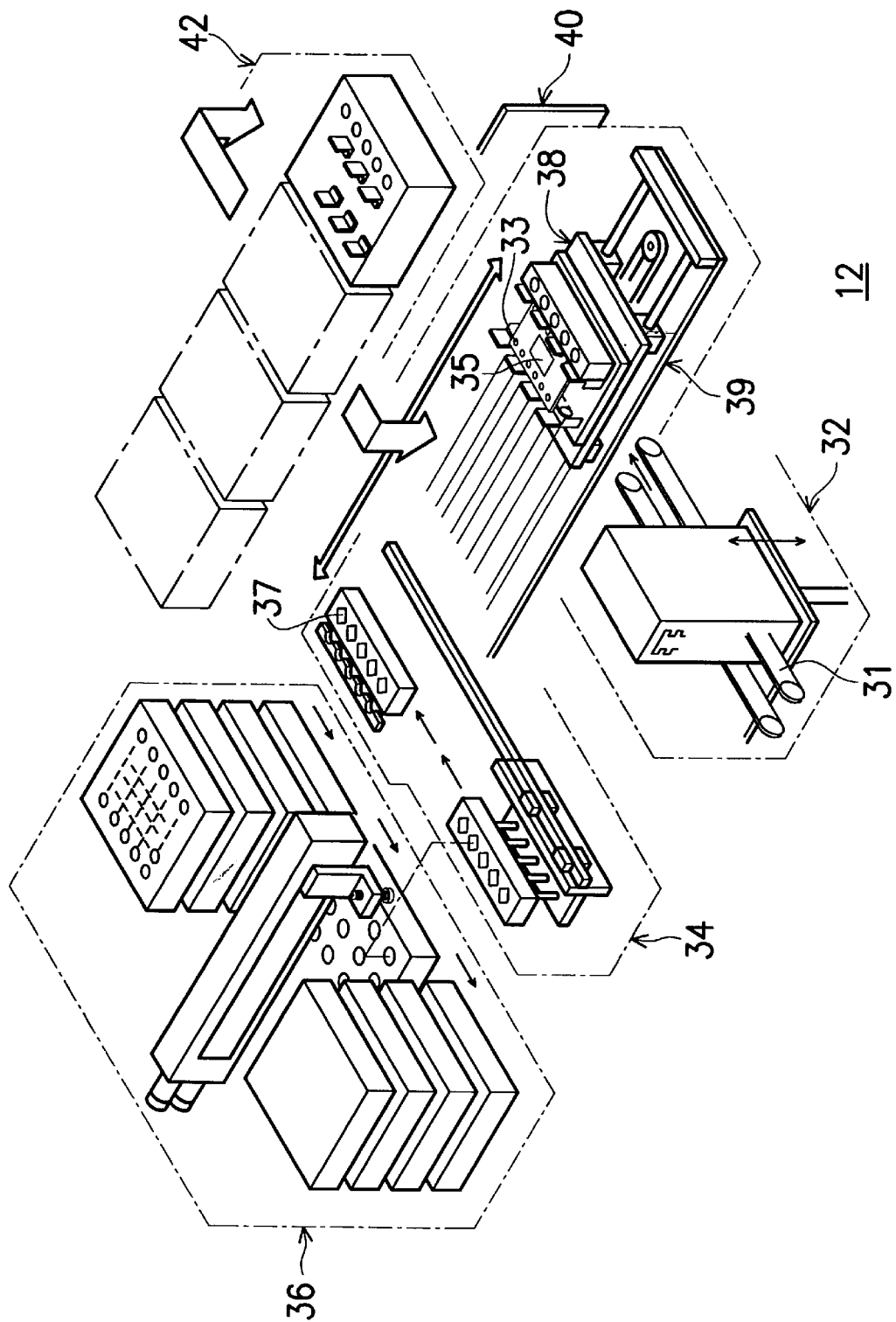
FIG. 3 is a perspective view of a loader assembly in the molding machine depicted in FIG. 2.

Referring now to FIG. 3, which is a perspective view of the loader assembly 12 in the molding machine 10 in FIG. 2, the operational components of the loader assembly 12 comprise a buffer 32, a tablet shuttle 34, a tablet palletizer 36, a distribution shuttle 38 and a platform 39, a shutter and base 40, and a frame transfer section 42.

In this embodiment, a frame 33 on a mold die 35 is received by the buffer 32 and sent onto the distribution shuttle 38 of the loader assembly 12 one frame at a time. Meanwhile, a tablet 37 in which resin or other stock material is stored is received by the tablet shuttle 34 from the tablet palletizer 36, moved to beneath the distribution shuttle 38, pre-aligned on the distribution shuttle 38, and pushed up to provide resin or other stock material therein to the distribution shuttle 38. Therefore, the frame 33 and the tablet 37 are secured onto the distribution shuttle 38, and then sent to the frame transfer section 42 by the distribution shuttle 38.

The detailed operation of the embodiment in FIG. 3 is described below. In this embodiment, the purposes of the tablet palletizer 36 are originally to stack a number of (for example, ten) palettes that are full of tablets, and to send the tablets to the tablet shuttle 34. The distribution shuttle 38 then receives the frame 33 transferred from the buffer 32 and the tablet 37 transferred from the tablet shuttle 34. The purposes of the distribution shuttle 38 are to detect positioning of the frame 33 with a frame detecting sensor(for example, a photo-sensor) and a positioning pin (not shown), to position them on the distribution shuttle 38 precisely, and to supply them onto the frame transfer section 42 to a mold section of the press assembly 14 for a forming press therein.

The shutter and base 40 separates the press assembly 14 from the loader assembly 12 when cleaning of the press assembly 14 and the mold section therein takes place. In this case, the buffer 32 may include a conveyor 31 with a belt for transferring the frame 33 to the distribution shuttle 38. The frame 33 on which a mold die 35 is placed is transferred to the distribution shuttle 38 by the conveyor 31 and a push-in member (not shown in FIG. 3) installed on the loader assembly 12 below the distribution shuttle 38.

Figure 1A:
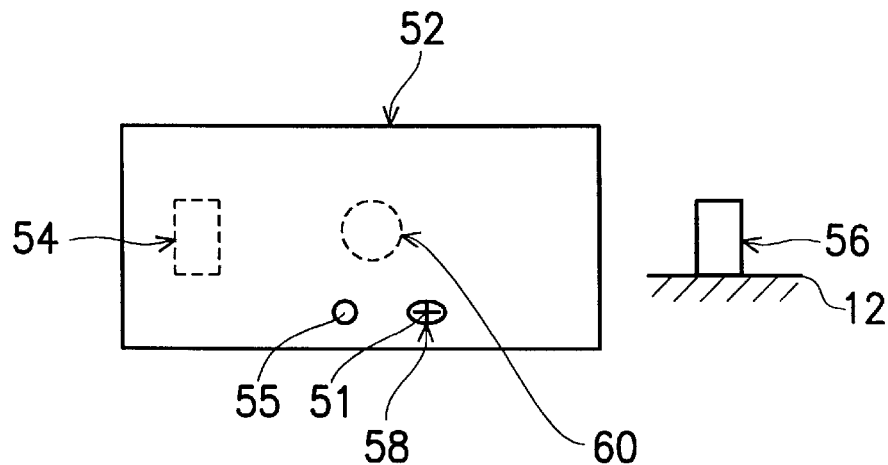
FIG. 1A (Prior Art) is a top view of a frame in a molding machine when the frame is mispositioned.
Figure 1B:
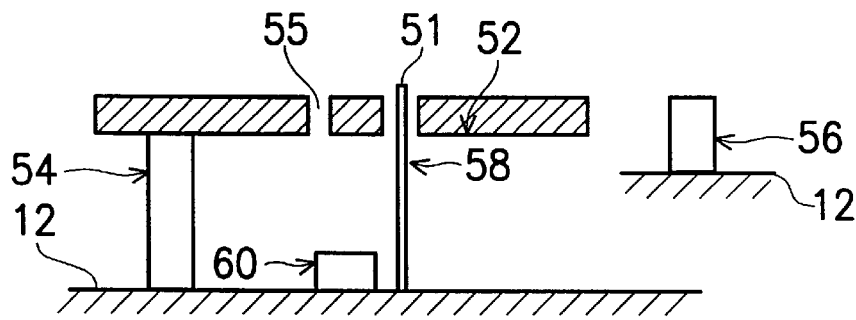
FIG. 1B (Prior Art) is a side view of the frame in FIG. 1A.

Referring to FIG. 1A (Prior Art) and FIG. 1B (Prior Art), which are respectively a top view of a frame in a molding machine when the frame is mispositioned and a side view of the frame in FIG. 1A, a frame 52 is supported and transferred by the buffer 32, which is likely a conveyor 31 with a belt(as shown in FIG. 3). The distribution shuttle 38 receives the frame 52 from the buffer 32. A push-in member 54 is installed to the loader assembly 12 near the buffer 32 and below the distribution shuttle 38 for pulling the frame 52 from the buffer 32 onto the distribution shuttle 38 when the frame 52 approaches the distribution shuttle 38; a stopper 56 is secured to the loader assembly 12 at the rear of the distribution shuttle 38 for stopping the incoming frame 52 when the frame 52 arrives at a predetermined position on the distribution shuttle 38. A position pin 58 is installed on the loader assembly 12 below the distribution shuttle 38 for piercing through a pre-designed hole 55 on the frame 52. And a frame detecting sensor (for example, a photo-sensor) 60 is secured to the loader assembly 12 below the distribution shuttle 38 for detecting the frame positioning in vertical direction (that is, the distance between the frame 52 and the distribution shuttle 38 in vertical direction) and generating an indicative signal to stop the subsequent processes when the frame is mispositioned.

Figure 1C:
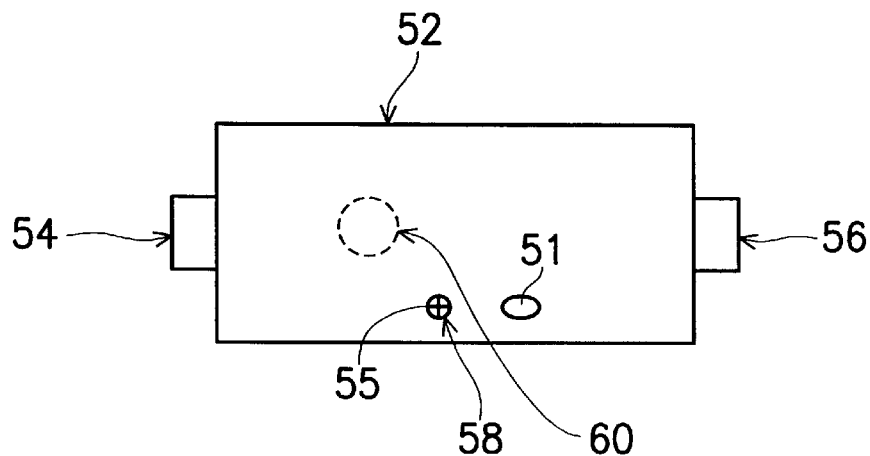
FIG. 1C (Prior Art) is a top view of a frame in a molding machine when the frame is correctly positioned.

Reference is now made to FIG. 1C (Prior Art), which is a top view of a frame in a molding machine when the frame is correctly positioned. In this case, the position pin 58 installed on the loader assembly 12 below the distribution shuttle 38 can exactly pierce through the hole 55 pre-designed on the frame 52. And the frame detecting sensor 60 secured to the loader assembly 12 below the distribution-shuttle 38 then detects the distance between the frame 52 and the distribution shuttle 38 in vertical direction for generating a signal to stop the processes when the frame 52 is mispositioned.

However, the detecting method is not always effective. After the frame 52 is transferred from the buffer 32 onto the distribution shuttle 38 by the push-in member 54 installed on the loader assembly 12(as shown in FIG. 2), the push-in member 54 will withdraw to its original position. At this time, the frame 52 will be drawn back by the push-in member 54.

Below is a detailed description of this case. When the buffer 32 (such as a conveyor 31 with a belt) starts to transfer the frame 52 onto the distribution shuttle 38, the push-in member 54 is first actuated and enabled to convey the frame 52 onto the distribution shuttle 38. In this embodiment, the push-in member 54 is often composed of a rod for supporting and pushing up the frame 52 to lead it to a predetermined position on the distribution shuttle 38. After the frame 52 arrives at the predetermined position on the distribution shuttle 38, the push-in member 54 withdraws to its original position and prepares for the next frame.

Unfortunately, when the push-in member 54 starts to withdraw, the push-in member 54 is not simultaneously lowered from the distribution shuttle 38 and does not completely leave the frame 52. Thus, the frame 52 will also be pulled back a little by the push-in member 54 at the same time. When this happens, the frame 52 becomes mispositioned, and the subsequent processes, such as a forming press in the mold section of the press assembly 14 will typically spill over resin on the frame 52. Therefore, the frame 52 is destroyed by the spill-over phenomenon of the mold die 35 located thereon. In addition, cleaning the mold section of the press assembly 14 is also difficult and time consuming.

As a consequence, the frame positioning on the distribution shuttle 38 has become an important issue. In a conventional molding machine, a position pin 58 and a frame detecting sensor 60(as mentioned above) are often installed and secured to the loader assembly 12 below the distribution shuttle 38 for piercing through the pre-aligned hole 55 on the frame 52 and detecting the frame positioning in vertical direction (that is, the distance between the frame 52 and the distribution shuttle 38) to generate an indicative signal to interrupt the molding process when the frame 52 is mispositioned. That is, when the distance between the frame 52 and the distribution shuttle 38 is different from a predicted one, or when the position pin 58 does not pierce through the pre-designed hole 55 on the frame 52, the frame 52 will be raised and the frame detecting sensor 60 can output an indicative signal to interrupt the subsequent processes. In this embodiment, the hole 55 is pre-designed on the the frame 52 so that the position pin 58(as mentioned above) installed on the loader assembly below the distribution shuttle 38 can pierce through when the frame 52 is mispositioned.

But, this detecting method is not always effective. Since the frame detecting sensor 60 is an unidirectional sensor(for example, a photo sensor) for detecting the frame positioning only in vertical direction, and the position pin 58 probably mistakably pierces through other hole, which is probably a tab hole 51 on the frame, this method can still misposition of the frame as shown in FIG. 1A and 1B. Therefore, resin contained in the tablets is still spilled on the undesired part of the press assembly 14 due to the wrong positioning of the frame, and the mold section in the press assembly still requires cleaning.

Figure 4:
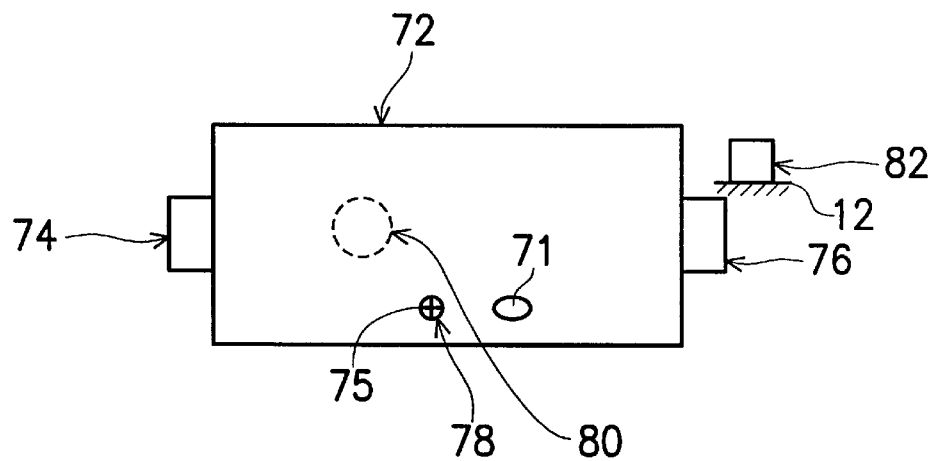
FIG. 4 is a top view of a frame in a molding machine according to the present invention when the frame is correctly positioned.
Figure 5:
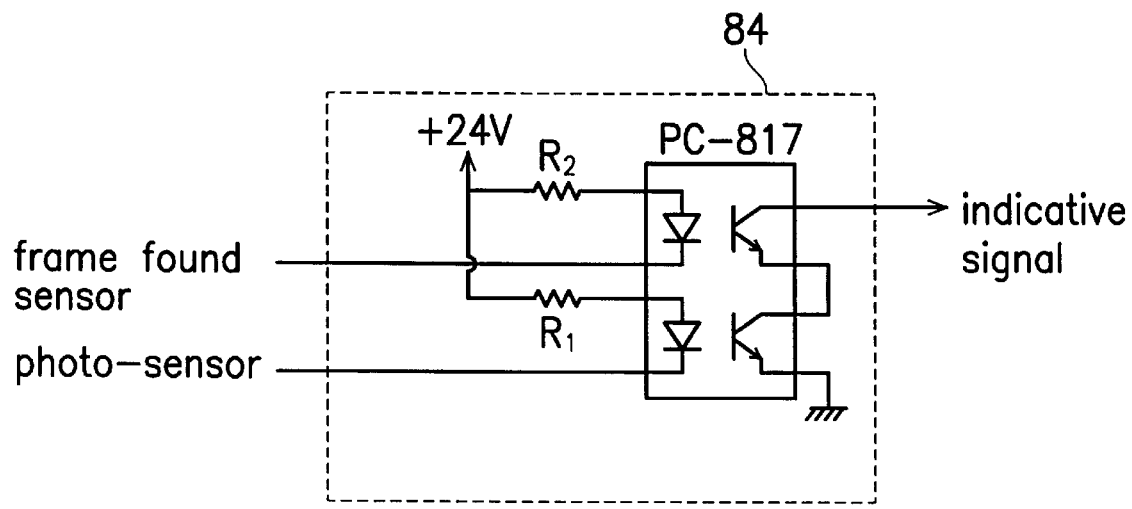
FIG. 5 shows an embodiment of a logic circuit according to the present invention.

Therefore, the present invention provides a molding machine including a loader assembly, a press assembly, and an unloader assembly. The molding machine can prevent spill-over onto the mold section of a press assembly due to wrong positioning of the frame on the distribution shuttle. Referring to FIG. 4, the molding machine 10 comprises: a buffer 32(for example, a conveyor with a belt) provided by the loader assembly 12 for transferring a frame 72 thereon to the distribution shuttle(not shown); a push-in member 74 installed to the loader assembly 12 below the distribution shuttle for supporting and pushing the frame 72 to a predetermined position on the distribution shuttle; a stopper 76 secured to loader assembly 12 at the rear of the distribution shuttle for stopping the incoming frame 72 when the frame 72 arrives at the predetermined position on the distribution shuttle; a position pin 78 installed to the loader assembly 12 below the distribution shuttle for piercing through a hole 75 pre-designed on the frame 72; a frame detecting sensor(for example, a photo-sensor) 80 secured to the loader assembly 12 below the distribution shuttle for detecting the distance between the frame 72 and the distribution shuttle in vertical direction. In this embodiment, the molding machine further comprises an additional photo-sensor 82 secured to the loader assembly 12 near the rear of the distribution shuttle for detecting the horizontal position of the frame 72 with respect to distribution shuttle. Then, the data from the frame detecting sensor 80 and the photo-sensor 82, which indicate the frame positioning can be determined without error. Further, the data from the frame found sensor 80 and the photo-sensor 82 can be inputted to a logic circuit 84 which is probably an AND gate or a PC817 as shown in FIG. 5, for outputting an indicative signal to stop the subsequent processes when the frame is mispositioned, so that spill-over and the need for mold cleaning are effectively reduced.

In conclusion, the present invention provides a molding machine comprising: a loader assembly for receiving a frame; a press assembly for receiving the frame from the loader assembly and molding the frame; an unloader assembly for receiving the frame from the press assembly and outputting the frame after molding. Besides the molding machine further comprises: frame-supply means for transferring the frame to the loader assembly; tablet-supply means for transferring a tablet to the loader assembly; a distribution shuttle for receiving and sending the frame and the tablet to the press assembly; a first sensor positioned near the distribution shuttle for detecting the frame in a first direction; a second sensor positioned near the distribution shuttle for detecting the frame in a second direction; and a logic circuit for determining positioning of the frame and generating a signal when the frame is mispositioned.

The foregoing description of a preferred embodiment of the present invention has been provided for the purposes of illustration and description only. It is not intended to be exhaustive or to limit the invention to the precise forms disclosed. Many modifications and variations will be apparent to practitioners skilled in this art. The embodiment was chosen and described to best explain the principles of the present invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A molding machine, comprising:
   a loader assembly for receiving a frame;
   a press assembly for receiving the frame from the loader assembly, and for molding a resin over the frame;
   a press assembly for receiving the frame from the loader assembly, and for molding a resin over the frame;
   an unloader assembly for receiving the frame from the press assembly, and for outputting the frame after molding;
   frame-supply means for transferring the frame to the loader assembly;
   tablet-supply means for transferring a tablet to the loader assembly;
   a distribution shuttle for receiving and sending the frame and the tablet to the press assembly;
   a first sensor positioned near the distribution shuttle for detecting the frame in a first direction with respect to the distribution shuttle;
   a second sensor positioned near the distribution shuttle for detecting the frame in a second direction with respect to the distribution shuttle; and
   a logic circuit for determining a position of the frame and generating a signal when the frame is mispositioned.

2. A molding machine as set forth in claim 1, wherein the logic circuit is an AND gate which outputs an error signal when either one or both of the first and the second sensors determine that the frame is mispositioned.

3. A molding machine as set forth in claim 1, wherein the first sensor detects the frame in a vertical direction and the second sensor detects the frame in a horizontal position.

4. A molding machine as set forth in claim 3, wherein the first sensor and the second sensor are photo-sensors.

5. A molding machine as set forth in claim 3, wherein the frame has a position hole therein, the molding machine further comprising a position pin installed to the distribution shuttle, the position hole being adapted to receive the position pin, for positioning the frame on the distribution shuttle.

6. A molding machine as set forth in claim 5, further comprising a stopper secured to the loader assembly near the distribution shuttle, for stopping the frame when the frame arrives at a predetermined position on the distribution shuttle.

7. A molding machine as set forth in claim 5, further comprising a push-in member installed to the loader assembly near the frame-supply means, for leading the frame onto the predetermined position on the distribution shuttle.

8. A molding machine as set forth in claim 7, wherein the push-in member is a rod.

9. A molding machine as set forth in claim 2, wherein the first sensor detects the frame in a vertical direction and the second sensor detects the frame in a horizontal position.

10. A molding machine, comprising:
    a frame;
    a press assembly for molding a resin over the frame;
    a distribution shuttle for receiving and sending the frame to the press assembly;
    a first sensor positioned near the distribution shuttle for detecting the frame in a first direction with respect to the distribution shuttle;
    a second sensor positioned near the distribution shuttle for detecting the frame in a second direction with respect to the distribution shuttle; and
    a logic circuit for determining the position of the frame and for generating a signal when the frame is mispositioned.

11. A molding machine as set forth in claim 10, wherein the logic circuit is an AND gate which outputs an error signal when either one or both of the first and the second sensors determine that the frame is mispositioned.

12. A molding machine as set forth in claim 10, wherein the first sensor detects the frame in a vertical direction and the second sensor detects the frame in a horizontal direction.

13. A molding machine as set forth in claim 12, wherein the first sensor and the second sensor are photo-sensors.

14. A molding machine as set forth in claim 12, wherein the frame has a position hole therein, the molding machine further comprising a position pin installed to the distribution shuttle, the position hole being adapted to receive the position pin, for positioning the frame on the distribution shuttle.

15. A molding machine as set forth in claim 14, further comprising a stopper located near the distribution shuttle, for stopping the frame when the frame arrives at a predetermined position on the distribution shuttle.

16. A molding machine as set forth in claim 14, further comprising a push-in member for leading the frame onto the predetermined position on the distribution shuttle.

17. A molding machine as set forth in claim 16, wherein the push-in member is a rod.

* * * * *